(12) United States Patent
Walls (10) Patent No.: US 7,774,825 B2
(45) Date of Patent: Aug. 10, 2010

(54) METHODS & APPARATUSES FOR CONTROLLING ACCESS TO SECURED SERVERS

(75) Inventor: Laurie Walls, Birmingham, AL (US)

(73) Assignee: AT&T Intellectual Property I, L.P., Reno, NV (US)

(*) Notice: Subject to any disclaimer, the term of this patent is extended or adjusted under 35 U.S.C. 154(b) by 1291 days.

(21) Appl. No.: 11/015,221

(22) Filed: Dec. 16, 2004

(65) Prior Publication Data
US 2006/0136994 A1 Jun. 22, 2006

(51) Int. Cl.
G06F 7/04 (2006.01)
(52) U.S. Cl. .................... 726/2; 726/27; 726/28; 726/29; 726/30; 713/182
(58) Field of Classification Search ............ 726/7, 726/27–30; 713/182
See application file for complete search history.

(56) References Cited

U.S. PATENT DOCUMENTS

| | | | | |
|---|---|---|---|---|
| 6,088,805 | A * | 7/2000 | Davis et al. | 726/10 |
| 6,584,454 | B1 * | 6/2003 | Hummel et al. | 705/59 |
| 6,697,811 | B2 * | 2/2004 | Brodsky | 707/10 |
| 6,996,620 | B2 * | 2/2006 | Chang et al. | 709/227 |
| 7,114,180 | B1 * | 9/2006 | DeCaprio | 726/18 |
| 7,299,259 | B2 * | 11/2007 | Petrovykh | 709/205 |
| 7,409,424 | B2 * | 8/2008 | Parker | 709/206 |
| 7,437,468 | B2 * | 10/2008 | Yamamoto et al. | 709/229 |
| 2002/0178271 | A1 * | 11/2002 | Graham et al. | 709/229 |
| 2004/0059941 | A1 * | 3/2004 | Hardman et al. | 713/201 |
| 2005/0240992 | A1 * | 10/2005 | Coley et al. | 726/11 |
| 2006/0015615 | A1 * | 1/2006 | Merle et al. | 709/225 |
| 2006/0085839 | A1 * | 4/2006 | Brandt et al. | 726/2 |

* cited by examiner

Primary Examiner—Nasser Moazzami
Assistant Examiner—Mohammad W Reza
(74) Attorney, Agent, or Firm—Myers Bigel Sibley & Sajovec, P.A.

(57) ABSTRACT

Methods and apparatuses for controlling access to a secured server based on at least one access criterion are provided. A method involves receiving a request from a submitter, for a requestor to access the secured server. The request includes data to verify access criteria. The method also involves verifying whether the access criterion has been met and authorizing access. Authorizing access to the server may include preparing an access authorization form and forwarding the access authorization form to an authorized access provider for access implementation. Verifying whether the access criterion has been met includes verifying whether access to the secured server is essential to responsibilities of the requester, the submitter is authorized to request access for the requestor, and the approver is authorized to request access to the secured server. The method also involves auditing authorized requestors and removing access authorization for each requester for whom the access criterion is no longer met.

13 Claims, 5 Drawing Sheets

REQUEST FORM — 117

A. Approver Information — 202

| Approver Name: | Select Approver |
| --- | --- |
| Form Submission Date: | |
| Approver's Phone Number: | |
| Approver's E-mail Address: | |
| Approver's Pager Address: | |

204, 205

B. Valid Business Reason — 207

209

C. Notes

D. Requestor Information — 212

| Action Add Modify Delete | Server Host name(s) | UID or CUID (lower case) | Requestor Name | Primary Group | Secondary Group | Home Directory (If other than /export/home/UID) | Login Shell | Organization | Owner/Vendor | Requestor Email/Pager Address | Requestor Phone Number |
| --- | --- | --- | --- | --- | --- | --- | --- | --- | --- | --- | --- |
| Select Ac | | | | Select Prima | Select Secon | | Select S | Select Or | Select Owne | | |
| Select Ac | | | | Select Prima | Select Secon | | Select S | Select Or | Select Owne | | |
| Select Ac | | | | Select Prima | Select Secon | | Select S | Select Or | Select Owne | | |
| Select Ac | | | | Select Prima | Select Secon | | Select S | Select Or | Select Owne | | |

214, 215, 217, 218, 220, 222, 224, 227, 228

E. REQUEST COMPLETED/IMPLEMENTED — 230

| CSA Completing Request | CSA Phone | CSA Email | Date Completed |
| --- | --- | --- | --- |
| | | | |

A. Approvers 204  307

| Approver Name | Organization/Server | Phone Number | Email Address |
|---|---|---|---|
| Sheri Doe | Internal Tapestry | 317-321-4403 | sheri.doe@bellsouth.com |
| Sherry Red | Internal Tapestry | 317-321-4420 | sherry.red@bellsouth.com |
| Greg C. | Internal BRAVO, UCM, DIA | 317-321-2306 | Gregory.c@bellsouth.com |
| David W. | Internal UCM, DIA, BRAVO | 317-321-3703 | david.w@bellsouth.com |
| David W. | Internal Reports | 317-321-2390 | david.w@bellsouth.com |
| Bettye S. | Internal Reports | 317-321-4240 | Bettye.s@bellsouth.com |
| Mario A. | Internal AR | 317-988-7741 | Mario.a@bellsouth.com |
| Maggie V. | Internal AR | 317-403-1107 | Maggie.v@bellsouth.com |
| Marcia Y. | External Tapestry | 317-988-6550 | Marcia.y@bellsouth.com |
| Steven M. | External Tapestry | 317-403-2438 | steven.m@bellsouth.com |
| Marcia Y. | External AR, UCM | 317-988-6550 | Marcia.y@bellsouth.com |
| Larry S. | External EDI | 317-403-1229 | larry.s@bellsouth.com |
| Marcus P. | External EDI | 317-444-8392 | marcus.p@bellsouth.com |
| Roger H. | External MAPS | 317-444-7090 | roger.h@external.com |
| Jennifer H. | External MAPS | 317-989-0383 | jennifer.h@external.com |
| Don S. | External CSA Team Lead | 317-444-8501 | don.s@external.com |
| Nancy S. | External CSA | 317-444-8511 | nancy.s@external.com |
| Glenda C. | External CSA |  | glenda.c@external.com |

B. Server Definitions & Applicable BBI Approver

| Server 'Group' | Tapestry | BBI Tapestry | BRAVO | UCM & DIA | EDI/Media | AR | Reports |
|---|---|---|---|---|---|---|---|
| Primary Approver | Sheri Doe | Sheri Doe | Greg C. | Dave W. | Sheri Doe | Mario A. | David W. |
| Backup Approver | Sherry R. | Sherry R. | Dave W. | Greg C. | Sherry R. | Maggie V. | Bettye S. |
| Server Hostnames | sof00183 | sof00284 | sof00349 | sof00691 | sof00189 | sof00227 | sof00190 |
|  | sof00185 | sof00345 | sof00690 | bdn00268 | sof00348 | sof00228 | sof00466 |
|  | sof00186 | sof00346 |  | bdn00269 | sof00349 | sof00229 | sof00516 |
|  | sof00343 | sof00510 |  |  |  | bos63226 | sof00285 |
|  | sof00344 | sof00764 |  | bos59371 |  | sof00283 | sof00511 |
|  | sof00458 | bos62947 |  | bos59372 |  |  |  |
|  | sof00459 |  |  |  |  |  |  |
|  | sof00512 |  |  |  |  |  |  |
|  | sof00765 |  |  |  |  |  |  |
|  | bdn00270 |  |  |  |  |  |  |

METHODS & APPARATUSES FOR CONTROLLING ACCESS TO SECURED SERVERS

FIELD

The present invention relates to security for network resources, and more specifically to apparatuses and methods for controlling access to secured servers.

BACKGROUND

Lack of controls related to granting access to secured servers can leave an organization or business vulnerable to sabotage. For example, gaps in server access authorization processes can permit undesirable access to secured servers. For instance, password files for those having access to secured servers may include people that either no longer work for a company or have moved on to other assignments that do not require access to the secured servers. Also, company authorization processes may permit any employee to call technical services and request access to secured servers without an approval process to verify whether a request is valid.

Additionally, some companies do not have a formal procedure for tracking and removing user accounts from secured servers once a user no longer needs access. Thus, a disgruntled employee who has left a company may still retain access to secured servers and potentially create havoc. For instance, when the servers are secured billing servers, depending on the disgruntled employee's access rights, he or she could delete service, create errors, and/or delete records to cause the billing system to lose records of services to be billed and thus lose revenue. Still further, proprietary and/or private information stored on the secured servers, such as customer specific information, could be open for undesirable use.

Accordingly there is an unaddressed need in the industry to address the aforementioned deficiencies and inadequacies.

SUMMARY

Embodiments of the present invention provide methods and apparatuses for controlling access to one or more secured servers. Embodiments of the present invention place controls around authorizing access to secured servers, for example secured billing servers for telecommunications companies. Standardized request and tracking processes are disclosed for controlling access to secured servers. The request processes ensure that all required access criteria are met when access authorization is requested. The tracking processes ensure that all authorized requesters or users are accurately included and/or removed when changes and/or incidents occur, such as job reassignments for users and/or server operating system upgrades.

One embodiment is a method for controlling access to a secured server based on an access criterion. The method involves receiving a request from a submitter, for a requester to access the secured server. The request includes data to verify the access criterion. The method also involves verifying whether the access criterion has been met and authorizing access to the secured server when the access criterion is met.

Another embodiment is a computer program product including a computer-readable medium having control logic stored therein for causing a computer to control access to a secured server based on at least one access criterion. The control logic includes computer-readable program code for causing the computer to receive from a submitter, a request for a requestor to access the secured server. The request includes data to verify access criteria. The control logic also includes computer-readable program code for causing the computer to verify whether the access criterion has been met and authorize access to the secured server.

Still another embodiment is an apparatus for controlling access to a secured server based on at least one access criterion. The apparatus includes a mechanism for receiving from a submitter, a request for a requestor to access the secured server where the request includes data to verify access criteria, a mechanism for verifying whether the access criterion has been met, and a mechanism for authorizing access to the secured server. The mechanism for verifying whether the access criterion has been met includes a mechanism for verifying whether access to the secured server is essential to responsibilities of the requester, whether the submitter is authorized to request access for the requester, and/or whether the approver is authorized to request access to the secured server.

BRIEF DESCRIPTION OF THE DRAWINGS

Illustrative embodiments of the present invention will be described with reference to the accompanying drawings, wherein:

FIG. 3 illustrates listings of authorized approvers, secured servers, secured server definitions, and approver server assignments utilized in an illustrative embodiment of the invention;

DETAILED DESCRIPTION OF THE DISCLOSED EMBODIMENTS

As described briefly above, embodiments of the present invention provide methods and apparatuses for controlling access to one or more secured servers. In the following detailed description, references are made to accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Figure 1:
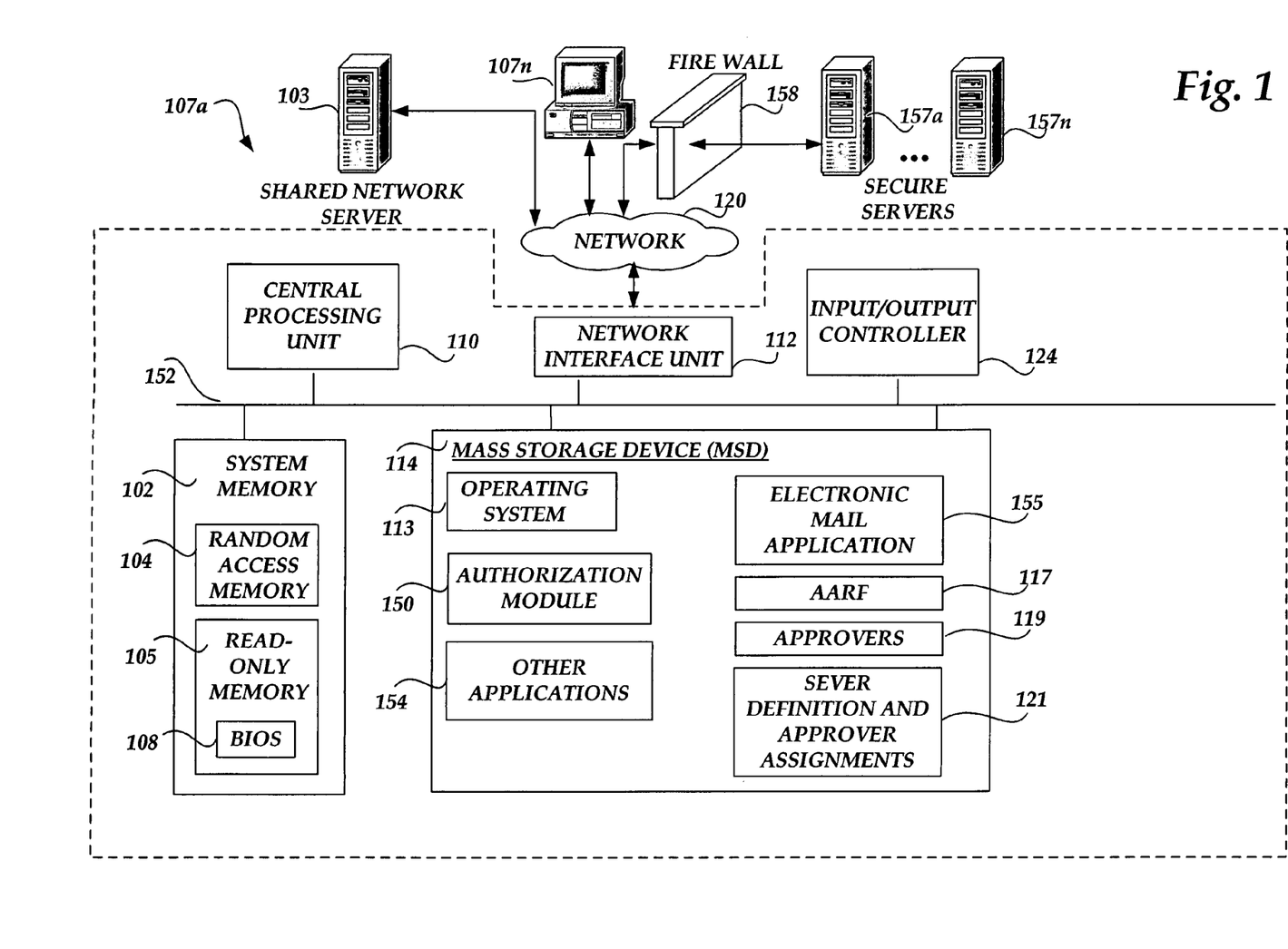
FIG. 1 illustrates an operating environment and computing apparatus architecture for a personal computer utilized in an illustrative embodiment of the invention.

Referring now to the drawings, in which like numerals represent like elements through the several figures, aspects of embodiments the present invention and the exemplary operating environment will be described. FIG. 1 and the following discussion are intended to provide a brief, general description of a suitable computing environment in which embodiments of the invention may be implemented. While the disclosed embodiments will be described in the general context of program modules that execute to control access to secured servers, those skilled in the art will recognize that the invention may also be implemented in combination with other program modules. Generally, program modules include routines, programs, operations, components, data structures, and other types of structures that perform particular tasks or implement particular abstract data types. Moreover, those skilled in the art will appreciate that embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

It is advantageous to describe an illustrative operating environment in which embodiments of the present invention may operate. FIG. 1 illustrates an operating environment and computing apparatus architecture for personal computers (PC) 107a-107n utilized in an illustrative embodiment of the invention. The PCs 107a-107n may be standard personal computers including a central processing unit 110, a system memory 102, and a system bus 152 that couples the system memory 102 to the CPU 110. The system memory 102 includes read-only memory (ROM) 105 and random access memory (RAM) 104. A basic input/output system 108 (BIOS), containing the basic routines that help to transfer information between elements within the PC 107a, such as during start-up, is stored in ROM 105. The PC 107a further includes a mass storage device (MSD) 114 for storing an operating system 113 such as WINDOWS XP, from MICROSOFT CORPORATION of Redmond, Wash., an authorization module 150 for controlling access and/or authorizing access to one or more secured servers 157a-157n through a security firewall 158, an electronic mail application 155 for sending notice of access authorization and receiving confirmations and notices of audit, and other applications 154, for example a spreadsheet and/or a web browser application. It should be appreciated that the MSD 114 may be a redundant array of inexpensive discs (RAID) system for storing data including software capable of supporting a TCP/IP or other protocol stack.

The MSD 114 is connected to the CPU 110 through a mass storage controller (not shown) connected to the system bus 152. The MSD 114 and its associated computer-readable media, provide non-volatile storage for the PC 107a. Although the description of computer-readable media contained herein refers to the MSD, such as a hard disk or CD-ROM drive, it should be appreciated by those skilled in the art that computer-readable media can be any available media that can be accessed by the CPU 110. An input/output controller 124 may also be included with the PC 107a for receiving and processing access criteria and other access request information. The input/output controller 124 communicates with the CPU 110 through the system bus 152.

The CPU 110 may employ various operations discussed in more detail below with reference to FIGS. 3-4 to control access to secured servers and audit authorized requestors/users. The CPU 110 may store data to and access data from the MSD 114, such as electronic memory or magnetic storage. Data is transferred to and received from the MSD 110 through the system bus 152. The CPU 110 may be a general-purpose computer processor or processor typically used for computing apparatuses. Furthermore as mentioned below, the CPU 110, in addition to being a general-purpose programmable processor, may be firmware, hard-wired logic, analog circuitry, other special purpose circuitry, or any combination thereof.

According to various embodiments of the invention, the PC 107a operates in a networked environment, as shown in FIG. 1, using logical connections to remote computing apparatuses, such as a shared network server 103, via network communication, such as, but not limited to, via an Internet and/or a local area network (LAN) 120. The PC 107a may connect to the network 120 via the network interface unit 112. It should be appreciated that the network interface unit 112 may also be utilized to connect to other types of networks and remote computer systems.

A computing apparatus, such as the PC 107a, typically includes at least some form of computer-readable media. Computer readable media can be any available media that can be accessed by the PC 107a. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage apparatuses, or any other medium that can be used to store the desired information and that can be accessed by the PC 107a.

Figure 2:
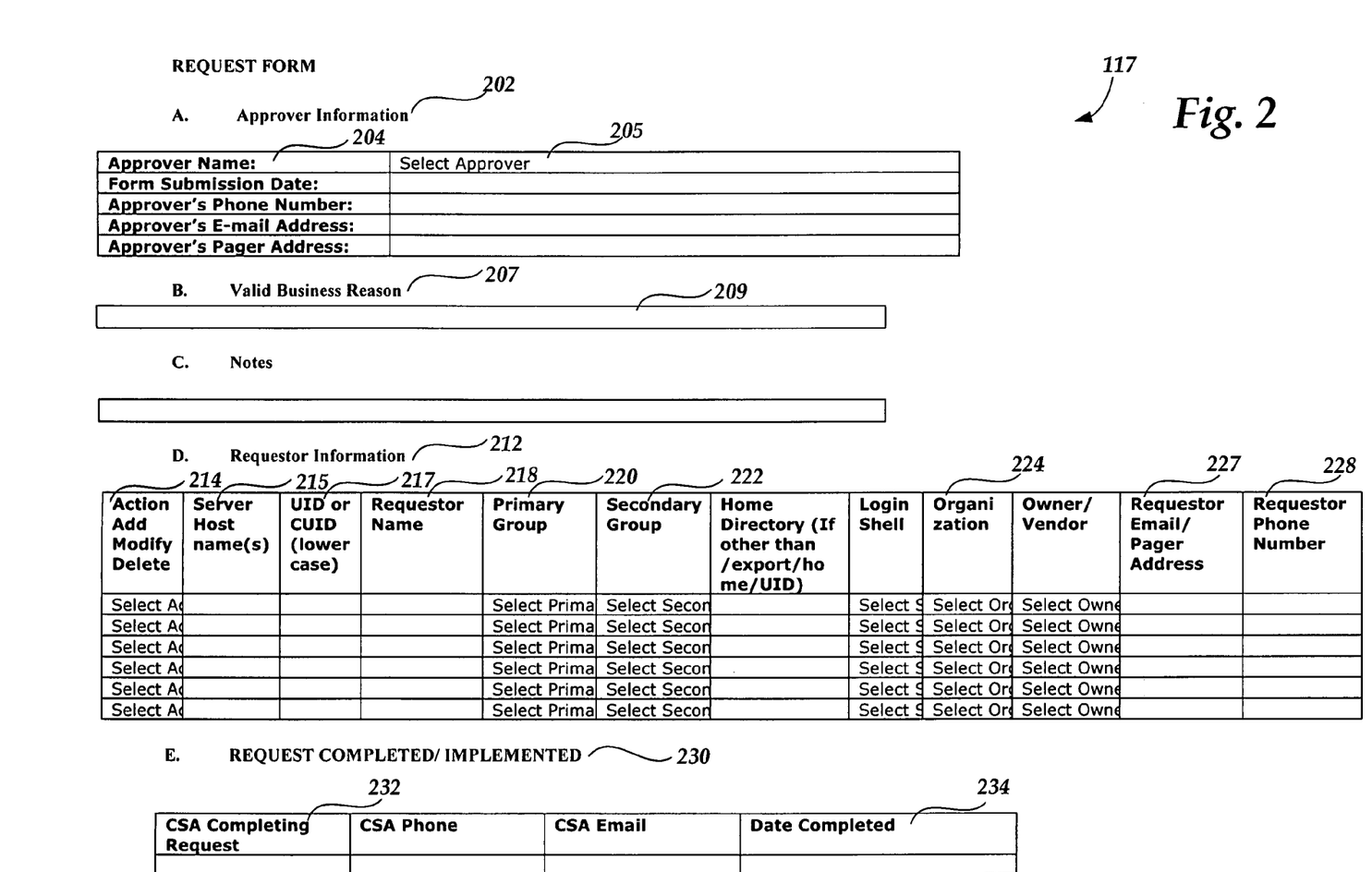
FIG. 2 illustrates an access authorization request form utilized in an illustrative embodiment of the invention.

Turning now to FIG. 2, an access authorization request form (AARF) 117 utilized in an illustrative embodiment of the invention will be described. The AARF 117 may be a word processor, spreadsheet, and/or interactive web-based document stored on and accessed via the MSD 114 and/or the shared server 103. The AARF 117 includes an approver information section 202 having a field for an approver name 204 that may include a drop down menu 205 for selection of authorized approvers of requests. The dropdown menu 205 may include authorized approver names 204 as described below with respect to FIG. 3. The approver information section 202 also includes fields for a form submission date, a phone number for the approver, an electronic mail address for the approver, and a pager address for the approver.

The AARF 117 also includes a valid business reason section 207 for receiving a reason 209 for the access request. This reason is usually because access is essential to the responsibilities of the requester. Still further, the AARF 117 includes a requestor/user information section 212 that includes fields for selecting an action 214, such as add, modify, or delete secured server access, a server host name 215, and a requestor identification number 217. The requestor/user information section 212 also includes a requestor name 218, a primary server group 220, a secondary server group 222, an organization 224 associated with the requester, an electronic mail address 227 for the requestor, and a phone number 228 for the requester.

Additionally, the AARF 117 includes a request completed/implemented section 230 for notifying the approver upon implementation of the access authorization by an authorized access provider or central system administrator (CSA). The request completed/implemented section 230 includes fields for a name 232 of the CSA completing the request, a date 234 the request is completed, and a phone number and an email address for the CSA.

FIG. 3 illustrates listings of authorized approvers, secured servers, secured server definitions, and approver server assignments stored on and accessed via the MSD 114 and/or the shared network server 103 and utilized in an illustrative embodiment of the invention. The listing of authorized approvers 119 includes the approver's name 204 which may be selected from the dropdown menu 205, names 307 of organizations and servers associated with an approver's name 204, a phone number for each listed approver, and an electronic mail address for each listed approver.

A listing of secured server definitions and approver assignments 121 includes a name for each server 312, a name for a primary approver 308 assigned to a secured server, a name of a backup approver 310 assigned to a secured server, and names 309 of each secured server group. Additional details regarding the use of the listings 119 and 121 will be described below with respect to FIG. 4.

Figure 4:
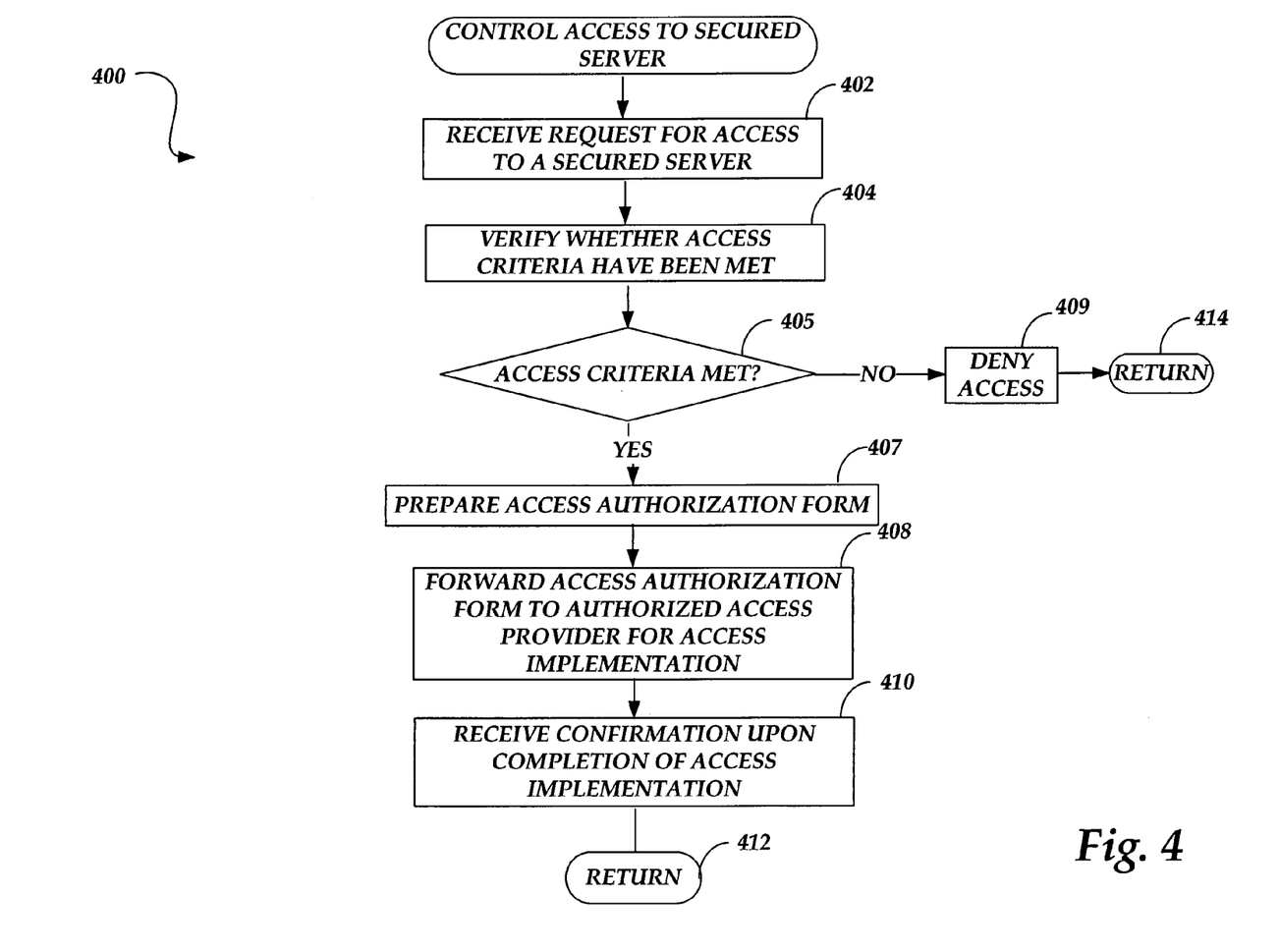
FIG. 4 illustrates an operational flow performed in controlling access to one or more secured servers according to an illustrative embodiment of the invention.

FIG. 4 illustrates an operational flow performed in controlling access to one or more secured servers according to an illustrative embodiment of the invention. A routine 400 begins at operation 402 where an approver and/or the authorization module 150 receives a request for access to a secured server 157 from a submitter. The submitter in this case must be an authorized manager of the requestor or the requestor must be a manager in order to meet an access criterion. Secondly, the request must include a valid business reason for the requester to have access to the secured server(s) 157. Further, the request must be submitted to an approver authorized to grant access to the server 157 requested. Each approver has responsibilities associated with the servers 157 the approver is assigned to authorize access.

The routine 402 then continues from operation 402 to operation 404 where the approver and/or the authorization module 150 verify whether the access criteria, such as a submitter manager, a valid business reason, and an authorized accountable approver have been met. Next, the routine 400 continues to detection operation 405 where the approver and/or the authorization module 150 make a determination as to whether the access criteria have been met. When the access criteria are not met, the routine 400 continues to deny operation 409 where the approver and/or the authorization module denies access to the requestor. The routine 400 then returns control to other routines at return operation 414.

When the access criteria are met, the routine 400 continues from detection operation 405 to operation 407 where the approver and/or the authorization module prepares the AARF 117 to authorize the request. Preparation of the AARF 117 is described above with respect to FIGS. 3 and 4. The approver and/or authorization module 150 may access the listings 119 and 121 to enter and/or receive respectively the access authorization data.

The routine 400 then continues to operation 408 where the approver and/or authorization module 150 forwards the AARF 117 to an authorized access provider for access implementation. The authorized access provider may be a provider, external to the company authorizing access. The authorized access provider technically sets up user access accounts including usernames and passwords. The authorized access provider may receive the AARF 117 via email. Next, at operation 410, the approver and/or authorization module 150 receives confirmation upon completion of access implementation by the authorized access provider. The confirmation may be received via email. The routine 400 then returns control to other routines at return operation 412.

Figure 5:
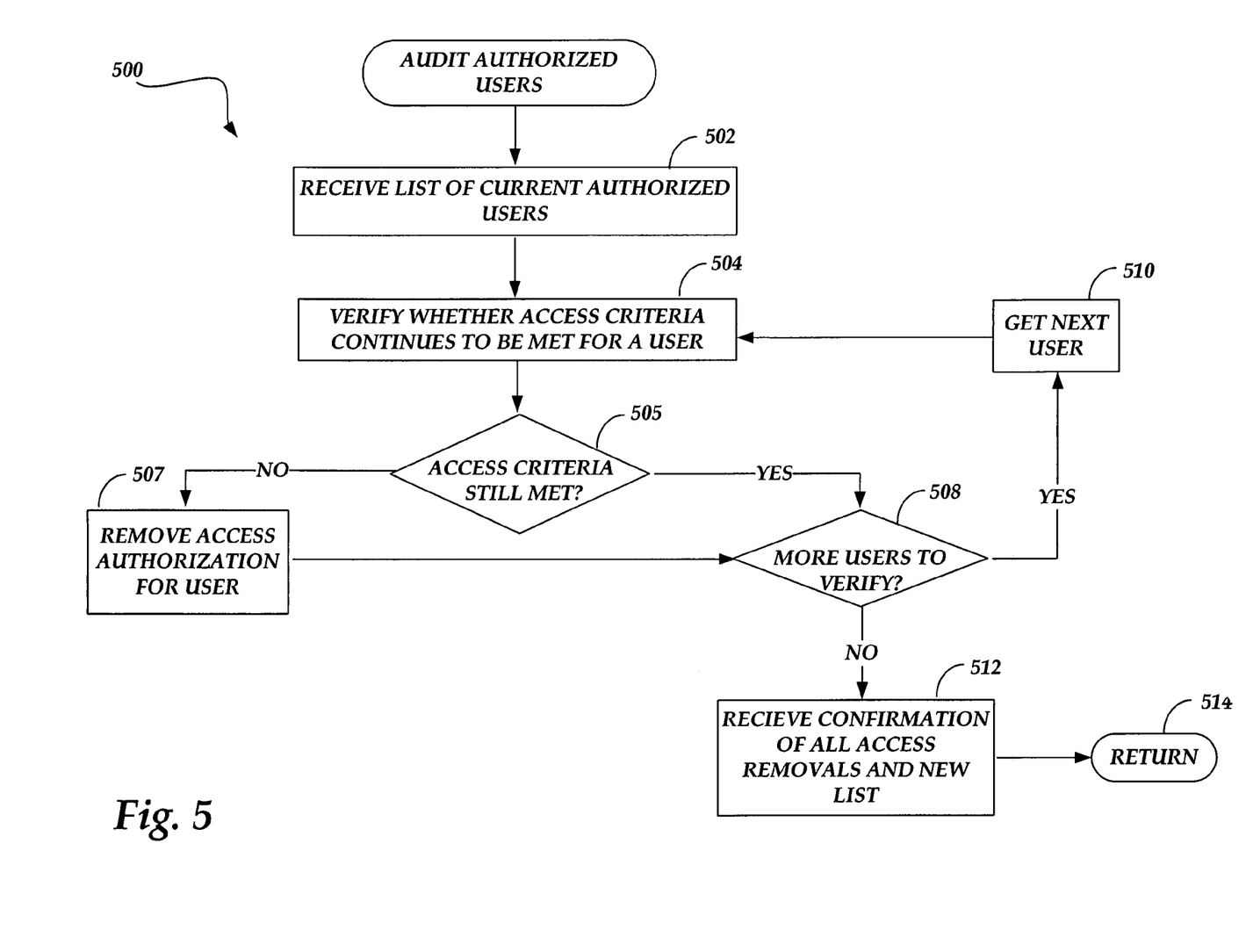
FIG. 5 illustrates an operational flow performed in auditing authorized users according to an illustrative embodiment of the invention.

FIG. 5 illustrates an operational flow performed in auditing authorized users according to an illustrative embodiment of the invention. The routine 500 begins at operation 502 where the approver and/or authorization module 150 receives a list of users/requestors currently authorized for access to the secured servers 157. The routine 500 then continues to operation 504 where the approver and/or the authorization module 150 verifies whether the access criteria continues to be met for a user.

Next, at detection operation 505, the approver and/or authorization module 150 determines whether the access criteria continue to be met for the user. When the access criteria continue to be met, the routine 500 continues to detect operation 508 where the approver and/or authorization module 150 determines whether there are more users to verify. When access criteria is no longer met, the routine 500 continues from detection operation 505 to operation 507 where access authorization is removed for that user. The routine 500 then continues to operation 508 described above.

At operation 508, when there are more users to verify, the routine 500 continues to operation 510 where the authorization module 150 and/or approver examines a next user for verification. The routine 500 then continues to operation 504 described above.

When there are no more users to verify at operation 508, the routine 500 continues to operation 512 where the approver and/or authorization module 150 receives confirmation of all access removals and a new list of currently authorized users. The routine 500 then returns control to other routines at return operation 514.

Thus, the present invention is presently embodied as methods and apparatuses for controlling access to one or more secured servers.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for controlling access to at least one secured server based on at least one access criterion, the method comprising:
   receiving from a submitter, a request for a requester to access the secured server wherein the request includes data to verify the access criterion;
   verifying whether the access criterion has been met; and
   authorizing access to the secured server responsive to verifying that the access criterion has been met;
   wherein the submitter comprises a manager of the requestor requesting access to the secured server;
   wherein the data comprises at least one of a user name associated with the requestor for access to the secured server, an email address associated with the requestor, and a telephone number associated with the requestor;
   auditing authorized requesters wherein auditing the authorized requestors comprises: receiving a list of all requestors authorized to access the secured server; verifying whether the access criterion continues to be met for each requestor authorized; and in response to the access criterion not continuing to be met for a requester authorized, removing access authorization for that requestor;
   sending confirmation of audit completion
   receiving a periodic instruction to audit authorized requestors wherein the authorized requestors are audited in response to receiving the periodic instruction; and
   receiving notice that at least one of a restore request and an operating system upgrade impacted password files of the secured server wherein the authorized requesters are audited in response to receiving the notice.

2. The method of claim 1, wherein authorizing access comprises:

preparing an access authorization form; and
forwarding the access authorization form to an authorized access provider for access implementation.

3. The method of claim 2 further comprising, upon completion of the access implementation, receiving confirmation of the access implementation.

4. The method of claim 2, wherein preparing the access authorization form comprises entering at least one of the following into the access authorization form: a name of an approver of the request; a date the access authorization form is forwarded; a phone number of the approver; an electronic mail address of the approver; a valid business reason for access authorization; a name of the requestor; an identification number of the requestor; an organization associated with the requester; a name of the secured server that will be accessible to the requester; and at least one of a name of a primary server group and a secondary server group.

5. The method of claim 4, wherein verifying whether the access criterion have been met comprises verifying at least one of the following: whether access to the secured server is essential to responsibilities of the requestor wherein the valid business reason comprises access being essential to the responsibilities of the requestor; whether the submitter is authorized to request access for the requestor; and whether the approver is authorized to request access to the secured server.

6. The method of claim 4, wherein the secured server is associated with an area of responsibility for the approver.

7. The method of claim 1 further comprising, authorizing one of removal of access to the secured server and modification of access to the secured server for the requestor authorized.

8. The method of claim 4, wherein entering the name of the approver includes entering one of a name of a primary approver and a name of a backup approver.

9. The method of claim 1 further comprising,
denying access in response to the access criterion not being met.

10. A non-transitory computer-readable medium having control logic stored therein for causing a computer to control access to at least one secured server based on at least one access criterion, the control logic comprising computer-readable program code for causing the computer to:
receive from a submitter, a request for a requestor to access the secured server wherein the request includes data to verify the access criterion;
verify whether the access criterion has been met; and
authorize access to the secured server responsive to verifying that the access criterion has been met;
wherein the submitter comprises a manager of the requestor requesting access to the secured server;
wherein the data comprises at least one of a user name associated with the requestor for access to the secured server, an email address associated with the requestor, and a telephone number associated with the requestor:
audit authorized requesters wherein audit authorized requestors comprises: receive a list of all requestors authorized to access the secured server; verify whether the access criterion continues to be met for each requestor authorized; and in response to the access criterion not continuing to be met for a requester authorized remove access authorization for that requestor;
send confirmation of audit completion;
receive a periodic instruction to audit authorized requestors wherein the authorized requestors are audited in response to receiving the periodic instruction: and
receive notice that at least one of a restore request and an operating system upgrade impacted password files of the secured server wherein the authorized requesters are audited in response to receiving the notice.

11. The non-transitory computer-readable medium of claim 10, wherein the computer-readable program code for causing the computer to authorize access to the secured server comprises computer-readable program code for causing the computer to: present an access authorization form; receive inputs into the access authorization form; and forward the access authorization form to an authorized access provider for access implementation.

12. The non-transitory computer-readable medium of claim 11, wherein the computer-readable program code for causing the computer to receive inputs into the access authorization form comprises computer-readable program code for causing the computer to receive at least one of the following into the access authorization form: a name of an approver of the request; a date the access authorization form is forwarded; a phone number of the approver; an electronic mail address of the approver; a valid business reason for access authorization; a name of the requestor; an identification number of the requester; an organization associated with the requester; a name of the secured server that will be accessible to the requester; and at least one of a name of a primary server group and a secondary server group; wherein the access authorization form comprises an interactive form; and wherein the computer-readable program code for causing the computer to verify whether the access criterion has been met comprises computer-readable program code for causing the computer to verify at least one of the following: whether access to the secured server is essential to responsibilities of the requestor wherein the valid business reason for access authorization comprises access being essential to the responsibilities of the requestor; whether the submitter is authorized to request access for the requestor; and whether the approver is authorized to request access to the secured server.

13. The non-transitory computer-readable medium of claim 10, further comprising computer-readable program code for causing the computer to audit authorize requestors wherein the computer-readable program code for causing the computer to audit authorized requesters causes the computer to: receive a list of all requestors authorized to access the secured server; verify whether the access criterion continues to be met for each requestor authorized; and in response to the access criterion not continuing to be met for a requestor authorized, remove access authorization for that requester.

* * * * *

UNITED STATES PATENT AND TRADEMARK OFFICE
CERTIFICATE OF CORRECTION

| | |
|---|---|
| PATENT NO. | : 7,774,825 B2 |
| APPLICATION NO. | : 11/015221 |
| DATED | : August 10, 2010 |
| INVENTOR(S) | : Walls |

It is certified that error appears in the above-identified patent and that said Letters Patent is hereby corrected as shown below:

Column 8, Claim 15, Line 4: Please correct "authorized" to read -- authorized, --

Signed and Sealed this
Fifteenth Day of February, 2011

David J. Kappos
*Director of the United States Patent and Trademark Office*